United States Patent
Li

(10) Patent No.: US 9,768,607 B2
(45) Date of Patent: Sep. 19, 2017

(54) SYSTEM AND METHOD FOR A MULTI-PHASE SNUBBER CIRCUIT

(71) Applicant: Infineon Technologies AG, Neubiberg (DE)

(72) Inventor: Chao Li, Beijing (CN)

(73) Assignee: Infineon Technologies AG, Neubiberg (DE)

( * ) Notice: Subject to any disclaimer, the term of this patent is extended or adjusted under 35 U.S.C. 154(b) by 109 days.

(21) Appl. No.: 14/709,095

(22) Filed: May 11, 2015

(65) Prior Publication Data
US 2016/0336733 A1    Nov. 17, 2016

(51) Int. Cl.
| | | |
|---|---|---|
| H02H 7/09 | (2006.01) | |
| H02H 3/20 | (2006.01) | |
| H02M 1/34 | (2007.01) | |
| H02M 1/08 | (2006.01) | |
| H02M 1/32 | (2007.01) | |
| H02M 7/5387 | (2007.01) | |
| H02H 7/08 | (2006.01) | |

(52) U.S. Cl.
CPC ............. *H02H 3/20* (2013.01); *H02M 1/34* (2013.01); *H02H 7/0838* (2013.01); *H02M 1/08* (2013.01); *H02M 1/32* (2013.01); *H02M 7/5387* (2013.01); *H02M 2001/346* (2013.01); *H02M 2001/348* (2013.01); *Y02B 70/1491* (2013.01)

(58) Field of Classification Search
CPC ............. H02M 1/34; H02M 2001/346; H02M 2001/348; H02M 3/1584; H02M 7/538; H02M 1/32; H02M 5/297; H02M 7/487; H02M 1/08; H02M 2001/344; H02M 3/07; H02M 5/458; H02M 1/096; H02M 2001/0032
USPC ............. 318/400.22, 400.26, 254.1; 363/132
See application file for complete search history.

(56) References Cited

U.S. PATENT DOCUMENTS

| | | | | |
|---|---|---|---|---|
| 4,310,866 A | * | 1/1982 | Wirth | H02M 1/38 361/111 |
| 4,410,810 A | * | 10/1983 | Christen | H03K 17/04213 327/375 |
| 4,414,479 A | * | 11/1983 | Foley | H02M 1/08 327/432 |

(Continued)

FOREIGN PATENT DOCUMENTS

DE    102007024659 A1    11/2008

OTHER PUBLICATIONS

RFE International, "Metal Oxide Varistor MOV-20mm Disc", High Surge, C5BA03, Rev. Sep. 13, 2011, 3 pages.

(Continued)

*Primary Examiner* — Paul Ip
(74) *Attorney, Agent, or Firm* — Slater Matsil, LLP

(57) ABSTRACT

In accordance with an embodiment, a circuit includes a snubber circuit configured to be coupled to outputs of n half-bridge driver circuits that are coupled to n corresponding inductive loads, such that n is an integer greater than one. The snubber circuit includes n diodes and n capacitors. Each of the n diodes are coupled between a corresponding output of the n half-bridge driver circuits and a floating common node, and each of the n capacitors coupled between a corresponding output of the n half-bridge driver circuits and the floating common node.

24 Claims, 12 Drawing Sheets

(56) References Cited

U.S. PATENT DOCUMENTS

| | | | | |
|---|---|---|---|---|
| 4,634,891 A * | 1/1987 | Yamagami | H01L 25/072 | 257/787 |
| 4,697,230 A * | 9/1987 | Neft | H02M 5/297 | 361/88 |
| 5,055,990 A * | 10/1991 | Miki | H01L 25/165 | 257/E25.031 |
| 5,070,426 A * | 12/1991 | Iwasa | H02M 7/5387 | 361/91.5 |
| 5,077,651 A * | 12/1991 | Kobayashi | H02M 1/34 | 363/132 |
| 5,258,902 A * | 11/1993 | Lindbery | H02M 1/34 | 363/132 |
| 5,450,308 A * | 9/1995 | Tai | H02M 1/08 | 327/440 |
| 5,828,559 A * | 10/1998 | Chen | H02M 1/34 | 363/132 |
| 5,841,645 A * | 11/1998 | Sato | H02M 7/487 | 363/132 |
| 5,841,647 A * | 11/1998 | Hoshi | H03K 17/08148 | 363/132 |
| 5,847,548 A * | 12/1998 | He | H02M 1/34 | 323/222 |
| 5,847,645 A * | 12/1998 | Boesch | B60C 23/061 | 340/442 |
| 5,946,178 A * | 8/1999 | Bijlenga | H02M 7/538 | 361/91.5 |
| 6,215,266 B1 * | 4/2001 | Goh | H02M 1/34 | 318/400.23 |
| 6,664,590 B2 * | 12/2003 | Deboy | H01L 29/0634 | 257/328 |
| 6,666,960 B2 * | 12/2003 | Arai | C25D 5/18 | 204/230.2 |
| 7,738,326 B2 * | 6/2010 | Kayanuma | G11B 7/0053 | 369/44.13 |
| 7,855,904 B2 * | 12/2010 | Kirbie | H02M 3/07 | 320/166 |
| 8,258,555 B2 * | 9/2012 | Lin | H01L 29/66727 | 257/288 |
| 8,362,529 B2 * | 1/2013 | Lin | H01L 29/739 | 257/288 |
| 8,499,885 B1 * | 8/2013 | Satou | H02P 6/12 | 180/443 |
| 8,502,485 B2 * | 8/2013 | Kudanowski | B62D 5/046 | 318/254.1 |
| 2002/0104755 A1 * | 8/2002 | Arai | C25D 5/18 | 204/230.2 |
| 2003/0025124 A1 * | 2/2003 | Deboy | H01L 29/0634 | 257/119 |
| 2006/0202636 A1 * | 9/2006 | Schneider | H02J 3/1842 | 315/291 |
| 2006/0245217 A1 * | 11/2006 | Kirbie | H03K 3/57 | 363/60 |
| 2007/0274014 A1 * | 11/2007 | Berberich | H01L 23/642 | 361/91.7 |
| 2007/0297202 A1 * | 12/2007 | Zargari | H02M 1/08 | 363/50 |
| 2008/0043500 A1 * | 2/2008 | Asano | H02M 1/34 | 363/56.12 |
| 2010/0017063 A1 * | 1/2010 | Maeda | B62D 5/0487 | 701/42 |
| 2011/0215374 A1 * | 9/2011 | Lin | H01L 29/739 | 257/139 |
| 2011/0273122 A1 * | 11/2011 | Murata | H02P 29/00 | 318/400.22 |
| 2012/0026757 A1 * | 2/2012 | Manabe | B60L 11/1887 | 363/21.12 |
| 2012/0049263 A1 * | 3/2012 | Lin | H01L 29/66727 | 257/306 |
| 2012/0086373 A1 * | 4/2012 | Kudanowski | B62D 5/046 | 318/400.22 |
| 2012/0086417 A1 * | 4/2012 | Osada | B60L 3/003 | 323/271 |
| 2012/0098507 A1 * | 4/2012 | Hasegawa | H02M 1/32 | 323/271 |
| 2012/0106204 A1 * | 5/2012 | Imanishi | H02M 3/1584 | 363/16 |
| 2012/0108883 A1 * | 5/2012 | Peterchev | A61N 2/02 | 600/14 |
| 2012/0139522 A1 * | 6/2012 | Hasegawa | B60L 11/1887 | 323/311 |
| 2012/0286712 A1 * | 11/2012 | Tsuboi | H02K 11/0073 | 318/400.26 |
| 2012/0294056 A1 * | 11/2012 | Temesi | H03K 17/08128 | 363/131 |
| 2012/0307533 A1 * | 12/2012 | Gekeler | H02M 7/487 | 363/41 |
| 2012/0320643 A1 * | 12/2012 | Yang | H02M 1/34 | 363/56.01 |
| 2013/0113405 A1 * | 5/2013 | Baranyai | B62D 5/0481 | 318/445 |
| 2013/0141871 A1 * | 6/2013 | Omae | B62D 5/0406 | 361/709 |
| 2013/0188404 A1 * | 7/2013 | Nakamura | H02M 5/458 | 363/37 |
| 2013/0336023 A1 * | 12/2013 | Yamanaka | H02M 5/458 | 363/37 |

OTHER PUBLICATIONS

"Dual High-Voltage Schottky Rectifiers," Vishay Semiconductors formerly General Semiconductor, MBR30HxxCT, MBRF30HxxCT, MBRB30HxxCT, Document No. 88866, Feb. 7, 2003, 3 pgs.

"Film Capacitors' Metallized Polyester Film Capacitors (MKT)," EPCOS, Series/Type: B32520 . . . 529, Apr. 2014, 45 pgs.

"Smart Highside High Current Power Switch," PROFET Data Sheet BTS555, Infineon Technologies AG, Jun. 1, 2010, 16 pgs.

"Transient Voltage Suppression Diodes," Axial Leaded—30000W > 30 KPA series, Littlefuse, Inc., Jan. 24, 2014, 6 pgs.

* cited by examiner

SYSTEM AND METHOD FOR A MULTI-PHASE SNUBBER CIRCUIT

TECHNICAL FIELD

The present disclosure relates generally to an electronic device, and more particularly to a system and method for a multi-phase snubber circuit.

BACKGROUND

Three-phase motor systems are pervasive in many applications from general industrial machinery to automotive uses such motors used to drive electric automobiles or provide other automotive functionality, such as power steering. Three-phase motors are generally very efficient, vibrate less and last longer than a single-phase motor of the same power under similar load conditions. However, in order to operate a three-phase motor using a DC power source or a single-phase AC power source, a three-phase control signals are generated in order to control and provide power to each phase of the three-phase motor.

One common way to generate each of the three phases is generate each of the three phases by using a series of electronic switches that are switched on and off using a pulse-width modulated signal having a duty cycle or pulse density proportional to each of the three phases. For example, each of the three phases may be generated using a half-bridge switching network that is coupled to a respective phase of the three-phase motor. Accordingly, the speed of the motor may be controlled by adjusting the pulse width modulated signal on the motor. Such half-bridge switching networks are typically implemented using semiconductor switching networks such as BJTs, MOSFETs and/or IGBTs. However, because the input impedance of a motor is generally inductive, high voltage switching transients are may result from the switching action of the switching networks of phase generation circuitry. Generally, circuits such as snubber circuits containing capacitor, diodes and/or other components are used to reduce the magnitude of such voltage transients in order to avoid damage to sensitive semiconductor components and to maintain high efficiency.

SUMMARY

In accordance with an embodiment, a circuit includes a snubber circuit configured to be coupled to outputs of n half-bridge driver circuits that are coupled to n corresponding inductive loads, such that n is an integer greater than one. The snubber circuit includes n diodes and n capacitors. Each of the n diodes are coupled between a corresponding output of the n half-bridge driver circuits and a floating common node, and each of the n capacitors coupled between a corresponding output of the n half-bridge driver circuits and the floating common node.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a snubber circuit in a three-phase motor driver circuit. Embodiments of the present invention may also be applied to other multi-phase circuits including, but not limited to generators, lighting systems, multi-phase power supplies switched-mode power supplies and electric power generation systems.

In an embodiment of the present invention, a snubber circuit is implemented using a network of diodes and capacitors that couple various phases of a system to a floating common node via a diode and a capacitor. During multi-phase operation, the various capacitors are charged and discharged in a regular manner. In some embodiments, a stable voltage of relevant capacitors after charging and discharging may be calculated in advance and/or may be well defined. The snubber network provides a freewheeling path for inductive discharge that may occur on one or more phases of the system. During an inductive discharge event, some or all of the discharged energy may be first transferred capacitors of the snubber circuit. In embodiments, the snubber circuit may be independently coupled to a multi-phase circuit or may be used in conjunction with phase separation switches.

When an embodiment snubber circuit is used in conjunction with phase separation switches, the snubber circuit further provides a freewheeling path for inductive currents when the phase separation switches are opened. In some embodiments, a protection circuit may be coupled to the phase separation switches that open the phase separation switches when a fault is detected. These phase separation switched may be opened simultaneously for safety reasons if the inverter stage is separated from the motor in an emergency situation. The phase separation switches may also be opened in order to implement a current limiting mode for protection against current flowing though the phase separation switches in case of a malfunction of the system.

Figure 1A:
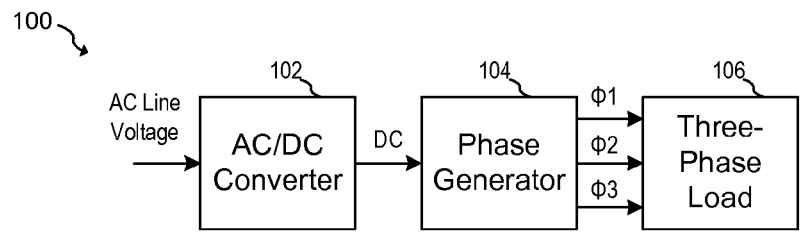
FIGS. 1a-1c illustrate exemplary multi-phase systems.

FIG. 1a illustrates an exemplary three-phase power supply system 100 that uses a single-phase AC line input voltage to power three-phase load 106. As shown, system 100 includes AC/DC converter 102 that converts the single-phase AC line input voltage to a DC voltage, and phase generator 104 that converts the DC voltage produces by AC/DC converter 102 into phases $\phi1$, $\phi2$ and $\phi3$ to supply three-phase load 106. AC/DC converter 102 may be implemented, for example, using various known switched-mode power supply architectures for converting an AC line voltage into a DC voltage. For example, AC/DC converter 102 may include a diode bridge rectifier followed by a switched-mode flyback converter. Phase generator 104, on the other hand, may be implemented using embodiment phase generation circuits described herein.

Figure 1B:
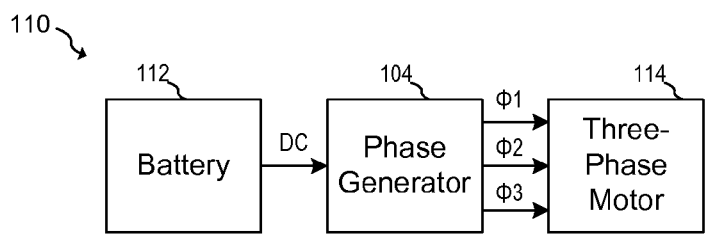

FIG. 1b illustrates a further exemplary power supply system 110 that uses battery 112 to power three-phase motor 114. As shown, battery 112 produces a DC voltage from which phase generator 104 produces phases $\phi1$, $\phi2$ and $\phi3$ to three-phase motor 114. A system such as power supply system 110 may be used, for example in an automotive system to supply power to an electric motor. Alternatively, power supply system 110 may be adapted to supply power to other types of three-phase loads besides an electric motor.

Figure 1C:
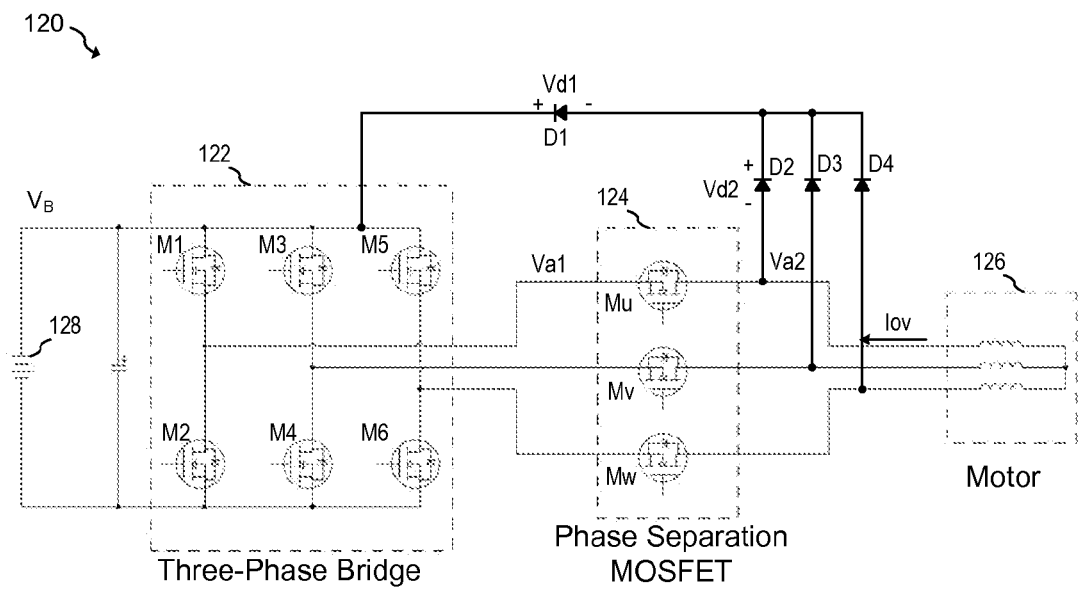

FIG. 1c illustrates conventional three-phase system 120 that uses power from battery 128 to supply power to three-phase motor 126. As shown, conventional three-phase system 120 includes three-phase bridge 122 followed by phase separation switches 124 prior to motor three-phase motor 126. During operation, the voltage of each phase provided to three-phase motor 126 is generated by providing pulse-width modulated switching signals to respective inverters in three-phase bridge 122. For example, a first phase is generated by providing switching signals to transistor M1 and transistor M2, a second phase is generated by providing switching signals to transistor M3 and transistor M4, and a third phase is generated by providing switching signals to transistor M5 and transistor M6. Such switching signals may be generated using a pulse-width modulator (not shown) using conventional three-phase generation techniques.

Phase separation switches 124 includes transistors Mu, Mv and Mw that isolate three-phase motor 126 from three-phase bridge 122 when transistors Mu, Mv and Mw are switched off, and provide a conductive path when transistors Mu, Mv and Mw are switched off. The use of such separation switches are used, for example to comply with such standards as ISO26262, which is a functional safety standard for automotive electric and electronic systems. By using phase separation switches 124, three-phase bridge 122 may be isolated from three-phase motor 126 in the case of an emergency such as inverter malfunction. Generally the three transistors Mu, Mv and Mw may be implemented using transistors such as MOSFETs, IGBTs or other transistors coupled between three arms of 3 phase bridges and three phase windings of the motor 126 as shown FIG. 1c. Each electronic switch is in series with a respective phase of the motor.

During operation, the inductance of three-phase motor 126, as well as other circuit inductance makes conventional three-phase system 120 prone to voltage overshoot within various nodes of the system. Such an overshoot voltage is generated by the motor inductor when turning off the electronic switch with current. The abnormal overshoot voltage may degrade turn-off behavior of the various electronic switching within conventional three-phase system 120 and may increase power loss when the various switches are turned off. In some cases, the various transistors in three-phase motor 126 may be prone to destruction due to high transient currents and voltages.

In order to mitigate the effects of large transients, a snubber circuit including diodes D1, D2, D3 and D4 are coupled between the output of phase separation switches 124 and power supply voltage $V_B$. During a transient at the input nodes of three-phase motor 126, diodes D1, D2, D3 and D4 provide a freewheeling path for inductive currents and limit the voltage at the input of three-phase motor 126 to two diode drops above voltage rail $V_B$. In some practical applications, diode D1 may be implemented using a diode module with a number of diodes connected in series because the phase separation MOSFETs may be unable cut off the freewheeling current of motor at the electric or dynamo-electric mode once any one of the top three MOSFETSs of the inverter bridge are closed. Any two-phase freewheeling current of the motor may be shorted by the snubber path if the common diode has a diode voltage of only about 0.6 v. Normally the phase separation MOSFETs turn off when malfunction is detected in order to prevent current flowing between phases. However, the current generated by a dynamoelectric mode may flow through the snubber path in and effectively creating a short circuit when the diode only has small forward voltage. Since avoiding blocked steering is a safety goal for electronic power steering (EPS), such systems are designed to avoid or mitigate the effects of such a short circuit. In one example of such a system, the diode module that implements diode D1 has a forward voltage in the range of about 8-18 V.

Moreover, in some systems, supply voltage $V_B$ may be in the range of about between about 8 V and about 18 V, which may be an appreciable voltage. Accordingly, such transients may consume a considerable amount of power. Due to the high voltages experienced, diode D1 may have a large geometry in order to avoid blocked steering when a driver turns the wheel manually, for example, in motor systems that are used for automotive power steering.

Figure 2A:
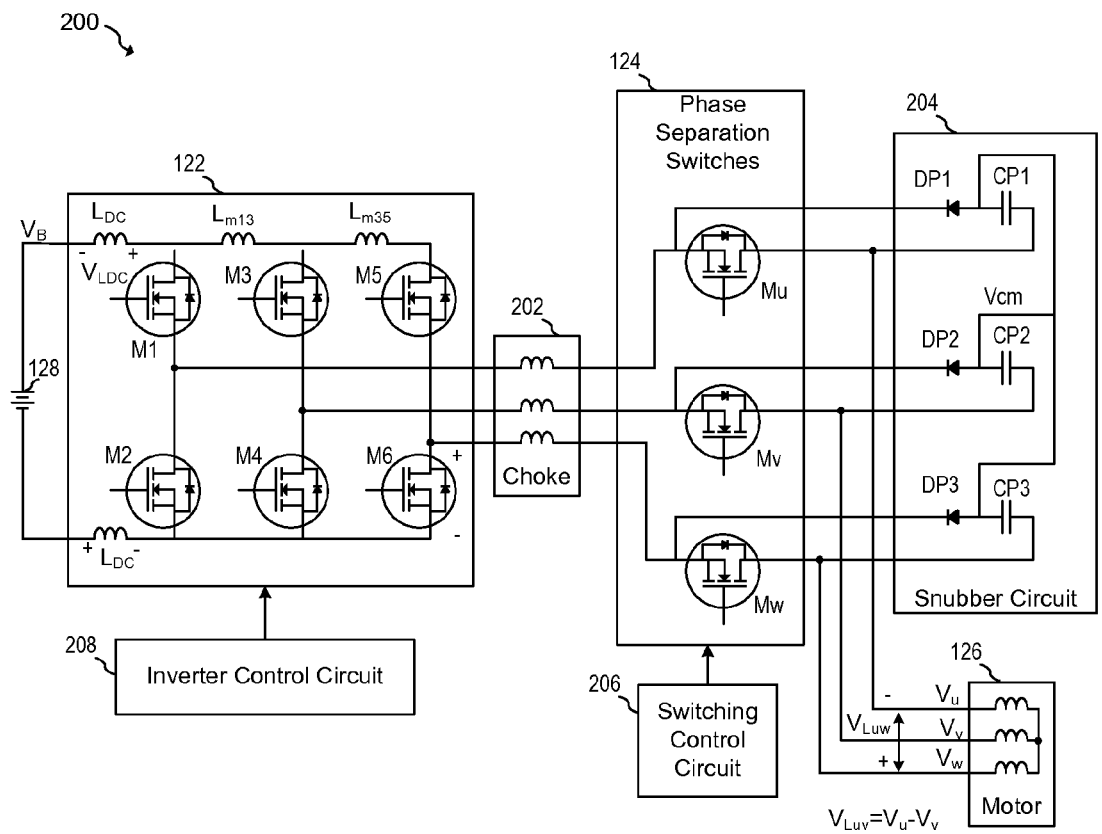
FIGS. 2a-2f illustrate embodiment three-phase systems with a snubber and phase-separation switches.
Figure 2B:
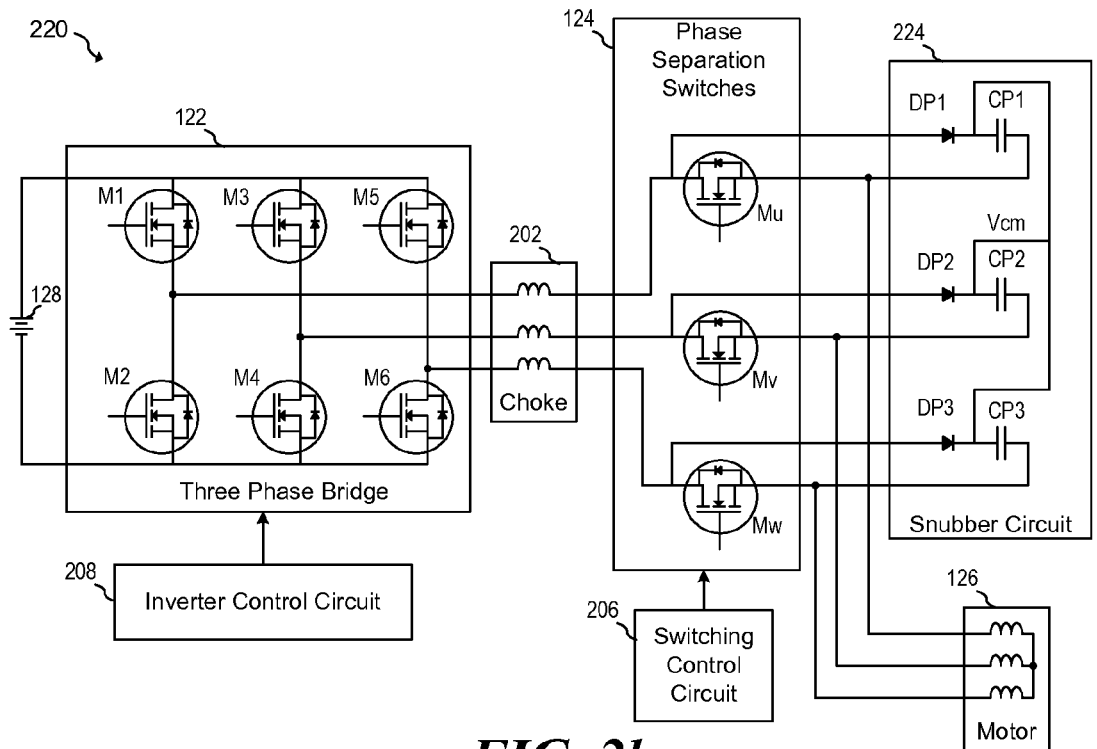

FIG. 2a illustrates three-phase system 200 according to an embodiment of the present invention. Similar to the embodiment shown in FIG. 1c, three-phase system 200 includes three-phase bridge 122, phase separation switches 124 and three-phase motor 126. In addition, three-phase system 200 includes three-phase snubber circuit 204 that includes diodes DP1, DP2 and DP3 and capacitors CP1, CP2 and CP3 coupled to phase separation switches 124. As shown, the anodes of diodes DP1, DP2 and DP3 and one plate of each capacitor CP1, CP2 and CP3 are connected to a floating common mode Vcm. Drive signals for three-phase bridge 122 is provided by inverter control circuit 208 and drive signals for phase separation switches 124 is provided by switching control circuit 206. Optional choke inductors 202 may also be included in order to suppress the switching on current seen by three-phase bridge 122 when higher capacitance values are used for capacitors CP1, CP2 and CP3 in three-phase snubber circuit 204.

During operation, capacitors CP1, CP2 and CP3 are synchronously charged by the various inverters in three-phase bridge 122. For example, when inverter switches within three-phase bridge 122 change state, a pair of phases simultaneously charge and discharge a pair of corresponding capacitors within three-phase snubber circuit 204. For example, when M1 is active and M4 is active, capacitor CP1 is charged and capacitor CP2 is discharged. Once the capacitor has been charged, current begins to flow through the corresponding inductive windings of three-phase motor 126. Finally, the voltages of the related components reach a balanced state a period of time after the current begins to flow through three-phase motor 126. In summary, current first flows into the related capacitors then flows through motor inductor when corresponding switches of three-phase bridge 122 are turned on.

As mentioned above, while one capacitor charges as another capacitor discharges. In fact, the capacitor that is being discharged is preparing for a next switching off of the respective switch that belongs to the same phase. For example, when transistor M3 is turned on and transistor M4 is turned off, transistor M3 recharges capacitor CP2.

When transistors in a related phase of three-phase bridge 122 turns off, the related snubber capacitors of three-phase snubber circuit 204 will begin to discharge since there is no freewheeling current flowing from three-phase motor 126 to three-phase bridge 122. Then after a short time, the current from the inductances of three-phase motor 126 will begin to flow through three-phase bridge 122. Finally, voltages of the related components will reach a quiescent or balanced point. Accordingly, the freewheeling current is distributed by related capacitors when switches of three-phase bridge switch off; one portion of freewheeling current flows through the capacitors of three-phase snubber circuit 204 and another portion of freewheeling current flows through three-phase bridge 122. Again, during this period, one capacitor is charges, while another capacitor discharges. The partial energy stored in motor inductors is transferred from motor inductor to the charging capacitor.

In one example, when transistor M6 turns off, the switching off voltage $V_{M6}$ of M6 can be calculated as follows:

$$V_{M6}=V_{LDC}+V_B+V_{LDC}+V_{Luv},$$

where, $V_{LDC}$ is voltage across the stray inductance between battery 128 and three-phase bridge 122, $V_B$ is the DC voltage of battery 128, and $V_{Luv}$ is the EMF voltage generated by motor inductor when switch M6 is switches off. In an embodiment, $V_{LDC}$ and $V_B$ are not influenced by three-phase snubber circuit 204, but the rising time of the voltage $V_{Luv}$ changes relatively longer than it without the snubber circuit because two snubber capacitors connected to the phases of three-phase motor 126 corresponding to transistors Mu and Mw in parallel suppresses the potentially sharp rising edge of $V_{Luv}$. The presence of three-phase snubber circuit 204 synchronously further reduces the peak value of the $V_{Luv}$ influenced by the stray inductances Lm13 and Lm35 because the current flowing the Lm13 and Lm35 changes less since a portion of the current flow through the corresponding capacitors of three-phase snubber circuit 204. A similar analysis could be made for turning off the remaining transistors M1, M2, M3, M4 and M5. Accordingly, three-phase snubber circuit 204 may improve the switching-off behavior of three-phase bridge 122 and may reduce the overshoot voltages of various nodes within three-phase system 200.

A related analysis may also be made with respect to what happens when Mu, Mv and/or Mw within phase separation switches 124 is turned off while current is flowing through three-phase motor 126. After the phase separation transistors Mu, Mv and Mw switches off, the EMF voltage $V_u$ of phase u and EMF voltage $V_v$ of phase v changes to a certain voltage level $V_{Luv}$ that keeps the freewheeling current flowing and charges capacitor by source composed of the $V_{Luv}$ and battery 128 coupled in series. After voltage $V_{Luv}$ is clamped by diodes in three-phase snubber circuit 204, by the body diodes of Mu, Mv and/or Mw, or by additional circuitry such as a varistor (see FIG. 2e), energy is released by motor phase windings or varistors itself. In some embodiments, the clamping voltage of the various components with three-phase system 200 is higher than the maximum voltage of battery 128.

In an embodiment, when phase separation switches 124 are opened, the voltages of each respective phase does not immediately jump to the clamping voltage, but experiences a gradual rise to the clamping voltage. In various embodiments, the rise time of the overshoot voltage when phase separation switches 124 shut off may be adjusted by adjusting the capacitance of capacitors CP1, CP2 and CP3. In addition, in various embodiments, three-phase motor 126 may be driven using various operation modes such as permanent magnetic synchronous motor (PMSM), brushless DC (BLDC) mode and others.

FIGS. 2b-2f illustrate various alternative embodiments of three-phase system 200 illustrated in FIG. 2a. For example, in FIG. 2b, three-phase system 220 includes snubber circuit 224 in which the polarity of diodes DP1, DP2 and DP3 have been reversed. For example, the cathodes of diodes DP1, DP2 and DP3 are connected to floating common node VCM instead of their anodes.

Figure 2C:
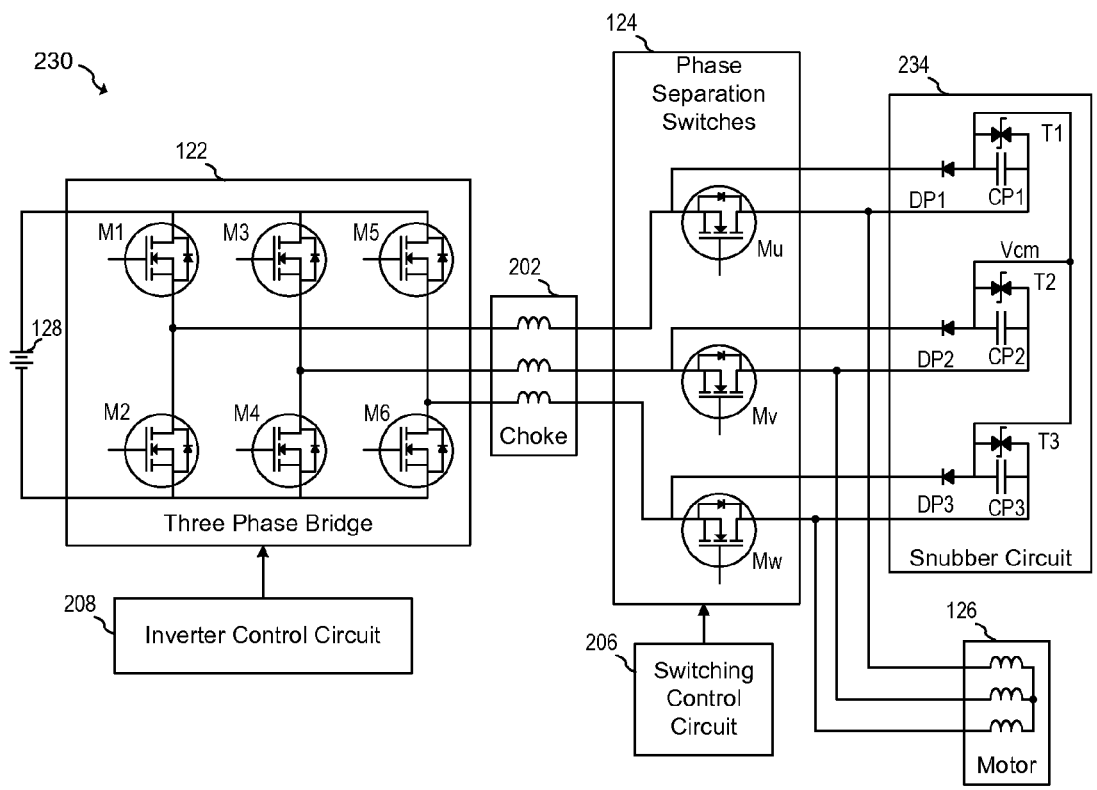
Figure 2D:
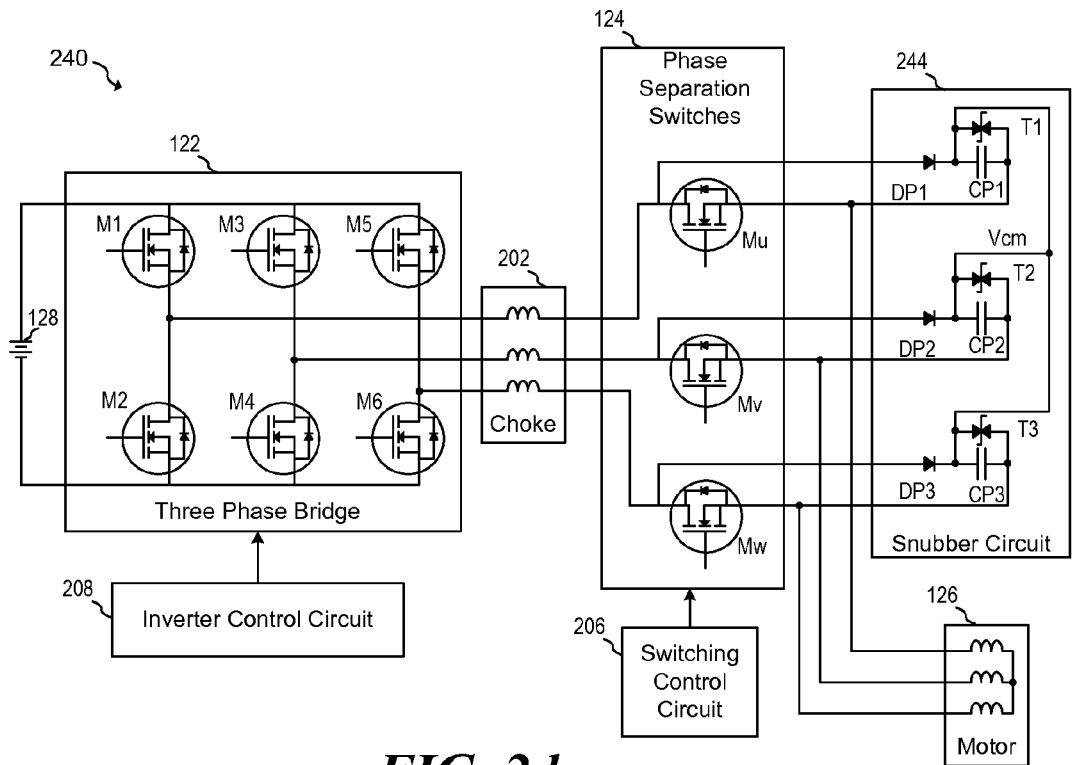

Three-phase system 230 in FIG. 2c is similar to system 200 shown in FIG. 2a with the addition of transient voltage suppression (TVS) diodes T1, T2 and T3 coupled in parallel to capacitors CP1, CP2 and CP3, respectively in snubber circuit 234. These transient suppression diodes may be used, for example, to clamp the voltage across capacitors CP1, CP2 and CP3 when phase separation switches 124 are opened. Three-phase system 240 shown in FIG. 2d is similar to three-phase system 230 shown in FIG. 2c, except that the polarity of diodes DP1, DP2 and DP2 are reversed in snubber circuit 243 compared to snubber circuit 234.

Figure 2E:
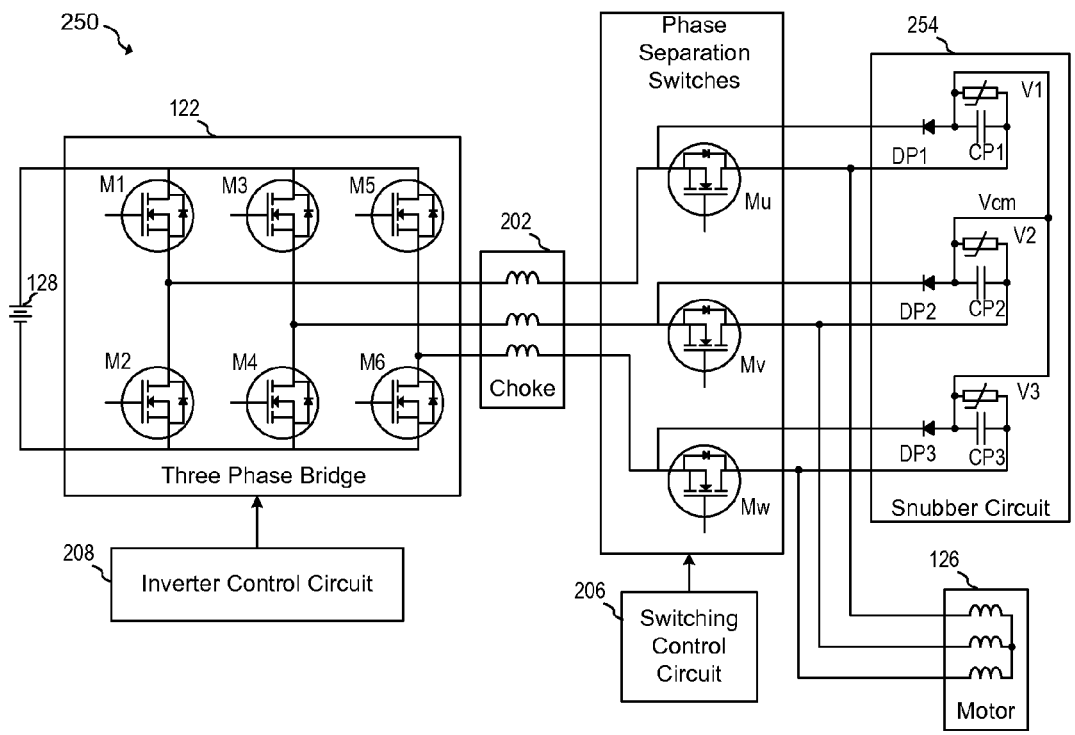
Figure 2F:
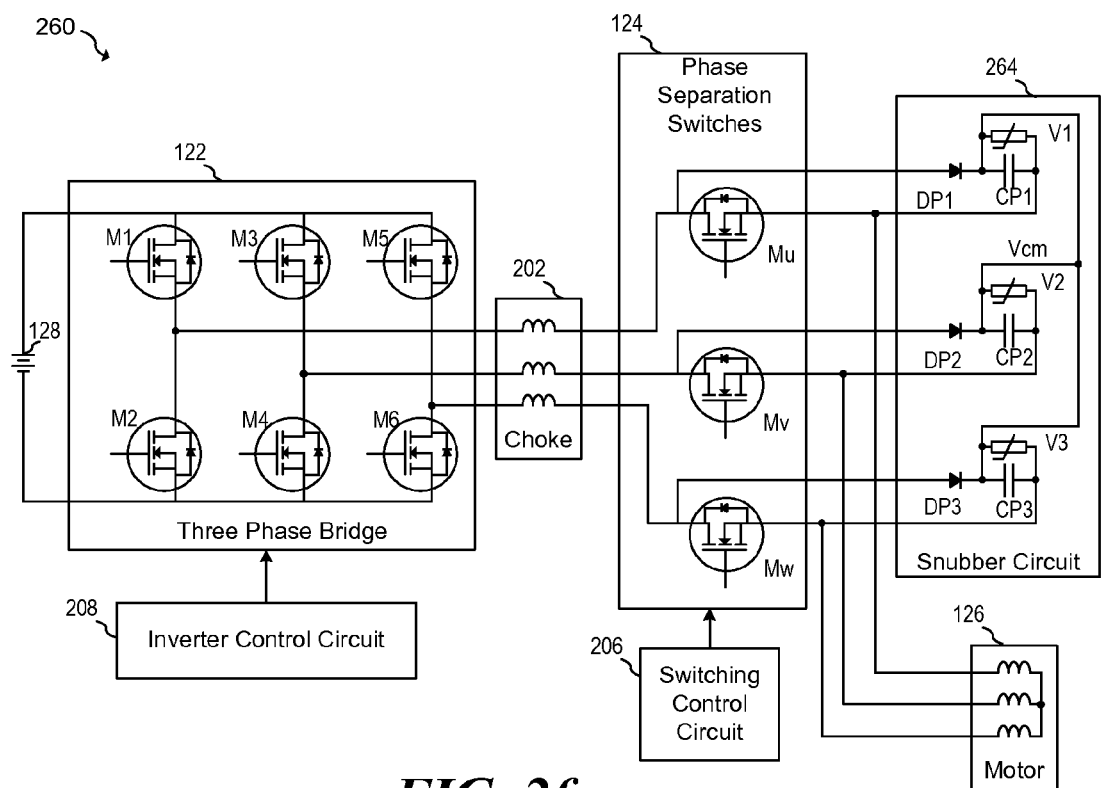

Three-phase system 250 in FIG. 2e is similar to system 200 shown in FIG. 2a with the addition of varistors V1, V2 and V3 coupled in parallel to capacitors CP1, CP2 and CP3, respectively in snubber circuit 254. These varistors may be used, for example, to clamp the voltage across capacitors CP1, CP2 and CP3 when phase separation switches 124 are opened. Three-phase system 260 shown in FIG. 2f is similar to three-phase system 250 shown in FIG. 2e, except that the polarity of diodes DP1, DP2 and DP2 are reversed in snubber circuit 263 compared to snubber circuit 254.

Figure 3:
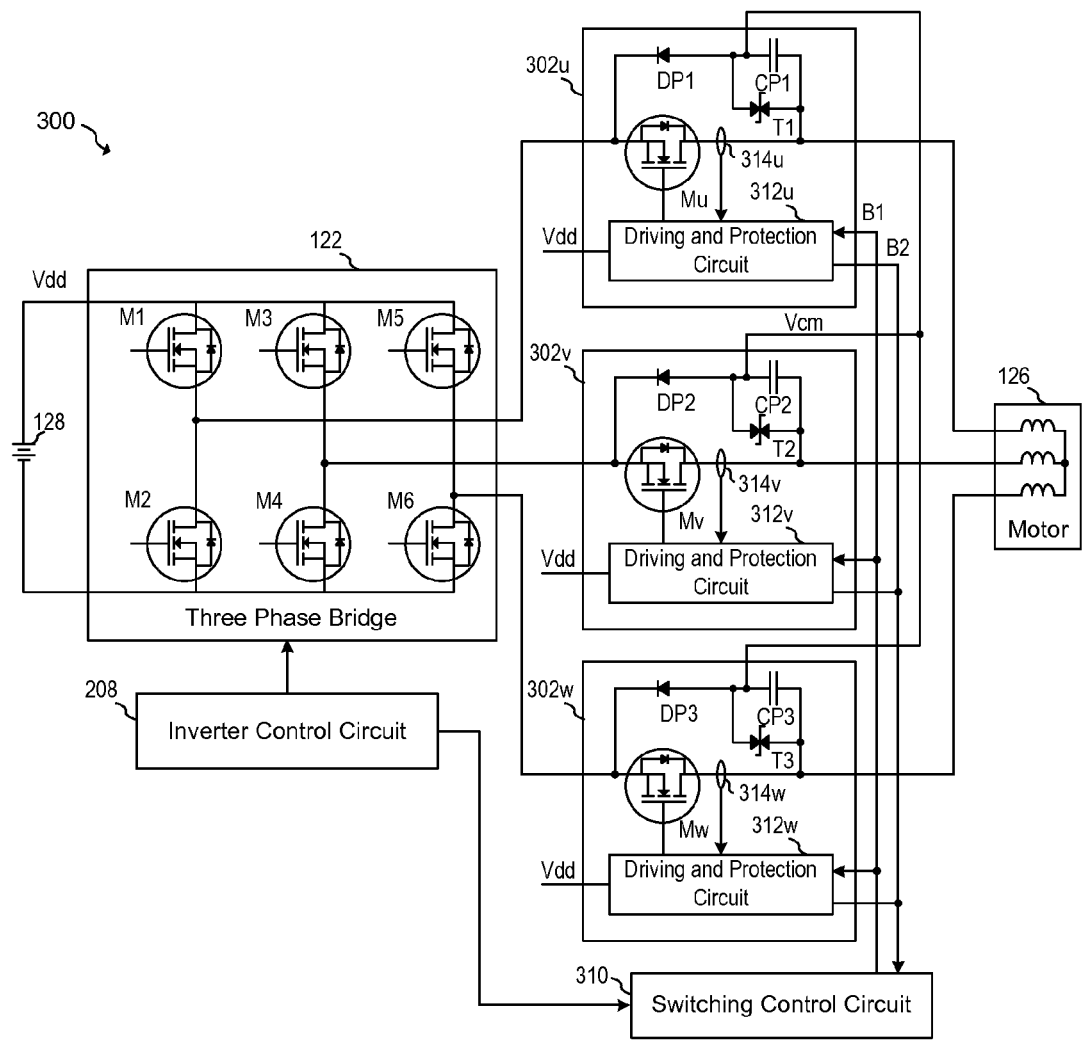
FIG. 3 illustrates a three-phase system having a snubber and phase-separation switches with driving and protection circuits.

In accordance with further embodiments of the present invention, further protection features are provided with respect to the activation of the phase separation switches. As shown in FIG. 3, three-phase system 300 includes three-phase bridge 122, three-phase motor 126 and a phase separation switch network that includes sub-phase separation devices 302u, 302v and 302w. Similar to the embodiment of FIG. 2c, these sub-phase separation devices 302u, 302v and 302w respectively include transistors Mu, Mv and Mw, and a snubber circuit diodes, DP1, DP2 and DP3, snubber circuit capacitors C1, C2 and C3 and snubber circuit TSV devices T1, T2 and T3. In an embodiment, each sub-phase separation device 302u, 302v and 302w further includes respective driving and protection circuit driving and protection circuit 312u, 312v and 312w and respective current measuring circuit 314u, 314v and 314w.

In an embodiment, current measuring circuits 314u, 314v and 314w each monitor the current flowing through their respective transistor Mu Mv and Mw. Each current measuring circuit may be implemented, for example, using a series resistor, a current mirror, or other current monitoring circuitry known in the art. Each current measuring circuit 314u, 314v and 314w reports their measurement to their respective driving and protection circuit 312u, 312v and 312w, which are configured to shut off their respective transistor in the event of a detected over voltage and/or over current condition. In some embodiments, each driving and protection circuit 312u, 312v and 312w compares its measured current value to a predetermined threshold and shuts off its respective transistor in response to detecting that the measured current value exceeds the predetermined threshold.

As shown, each driving and protection circuit 312u, 312v and 312w is coupled to switching control circuit 310 via bus lines B1 and B2. Each driving protection 312u, 312v and 312w asserts an active signal on bus line B2 when an over current, over voltage or other error condition is detected within it respective sub-phase separation device, and receives an activation signal from switching control circuit 310 via bias line B1. In some embodiments, switching control circuit 310 is configured to deactivate all switching transistors Mu, Mv and Mw when one of driving and protection circuits 312u, 312v and 312w indicates an error condition such as an over voltage condition or an over current condition. Switching and control circuit 310 may deactivate all switching transistors at the same time, for example, via bus line B1. In some embodiments, other bus line structure may be used. For example, a single line may be shared between sub-phase separation devices 302u, 302v and 302w such that the deactivation signals are "wire-ORed" together. In an embodiment, switching control circuit 310 may reactivate transistors Mu, Mv and Mw after a period of time. In an embodiment, this time is determined by comparing an output voltage of a charging RC circuit to a threshold.

In an embodiment, driving and protection circuits 312u, 312v and 312w may provide one or more of overload protection, current limit protection, short circuit protection, over temperature protection, over voltage protection, fast deenergizing of inductive loads, as well as diagnostic feedback. In further embodiments, polarity of the diodes DP1, DP2 and DP3 may be reversed and the TSV circuits T1 T2 and T3 may be omitted or replaced with other components such as varistors as shown in FIGS. 2a, 2b and 2c-2f.

In an embodiment, malfunction protection is implemented automatically and independently using three sub-phase separation devices 302u, 302v and 302w. This means the malfunction current protection function is independent from the input signal emanating from inverter control circuit 208 and is not influenced by the delay of this input signal, the status of inverter control circuit 208 and the status of three-phase bridge 122. Moreover, transistors Mu, Mv and Mw may be switched on or off synchronously, even during a current limiting mode, such that there is not continual current flowing through the windings of three-phase motor 126 after switching off the transistors Mu, Mv and Mw.

Figure 4A:
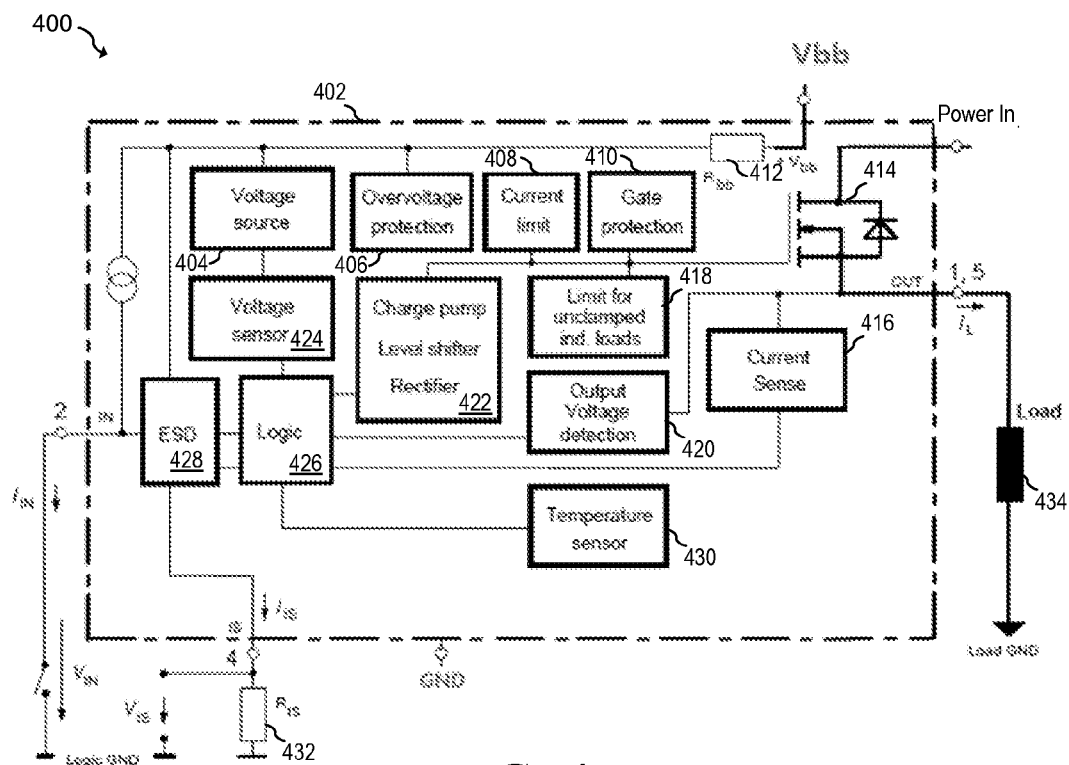
FIGS. 4a and 4b illustrate embodiment phase-separation integrated circuits.

FIG. 4a illustrates a portion of an embodiment sub-phase separation system 400 that includes integrated circuit 402 configured to be coupled to load 434 and external resistor 432. As shown, integrated circuit 402 includes switching transistor 414 that is activated by charge pump, level shifter and rectifier block 422. Charge pump, level shifter and rectifier block 422 generates a voltage that is high enough to drive switching transistor 414 by using charge pump supply boosting techniques known in the art.

Integrated circuit 402 further includes various blocks such as voltage source 404 that receives power from external pin VBB via resistors 412 and provides an internal supply voltage to integrated circuit 402. Over voltage protection block 406, current limit block 408, gate protection block 410, and limit for unclamped inductive load block 418 provide protection to switching transistor 414. Current sense block 416 senses the current flowing through switching transistor 414 and temperature sensor 430 monitors the temperature on integrated circuit 402. As shown, the output of voltage sensor block 424, current sensor block 416, temperature sensor block 430 and output voltage detection block 420 are coupled to logic block 426. ESD block 428 provides ESD protection to integrated circuit 402.

In an embodiment, an error condition that is detected by one of the various blocks on integrated circuit 402 is signaled by increasing an output current at pin IS that is coupled to resistor 432. During such an error condition, the voltage across resistor 432 increases.

Figure 4B:
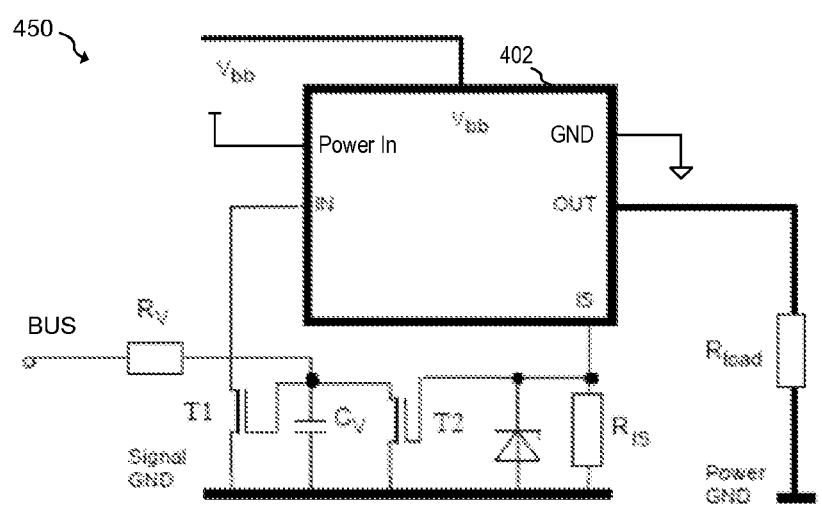

FIG. 4b illustrates a schematic of a portion of a sub-phase separation device that includes integrated circuit 402 described above, as well as various components $R_{IS}$, T2, $C_V$, T1 and $R_V$ that may be used to shut down transistor 414 (See FIG. 4a) in the event of a detected error condition. As shown, when the current from pin IS increases, there is an increase in the voltage across resistor $R_{IS}$. When the voltage across resistor $R_{IS}$ exceeds the threshold voltage of transistor T2, capacitor $C_V$ is discharged, thereby shutting off transistor T1. When integrated circuit 402 detects that the amount of current flowing through pin IN has decreased below a predetermined threshold. Transistor 414 (See FIG. 4a) within integrated circuit 402 is shut off. Moreover, the state of integrated circuit 402 with respect to its shutdown condition is signaled via resistors $R_V$. In some embodiments, other integrated circuits used in other sub-phase separation devices may also be coupled to signal BUS via similar circuitry. Accordingly, once transistor T2 has discharged capacitor $C_V$, other sub-phase separation devices may also be shutdown via signaling on signal BUS. In an embodiment, resistor $R_V$ and capacitor $C_V$ may be used to determine a period of time in which integrated circuit 402 is reactivated via the BUS according to the time constant $R_V C_V$.

Figure 4C:
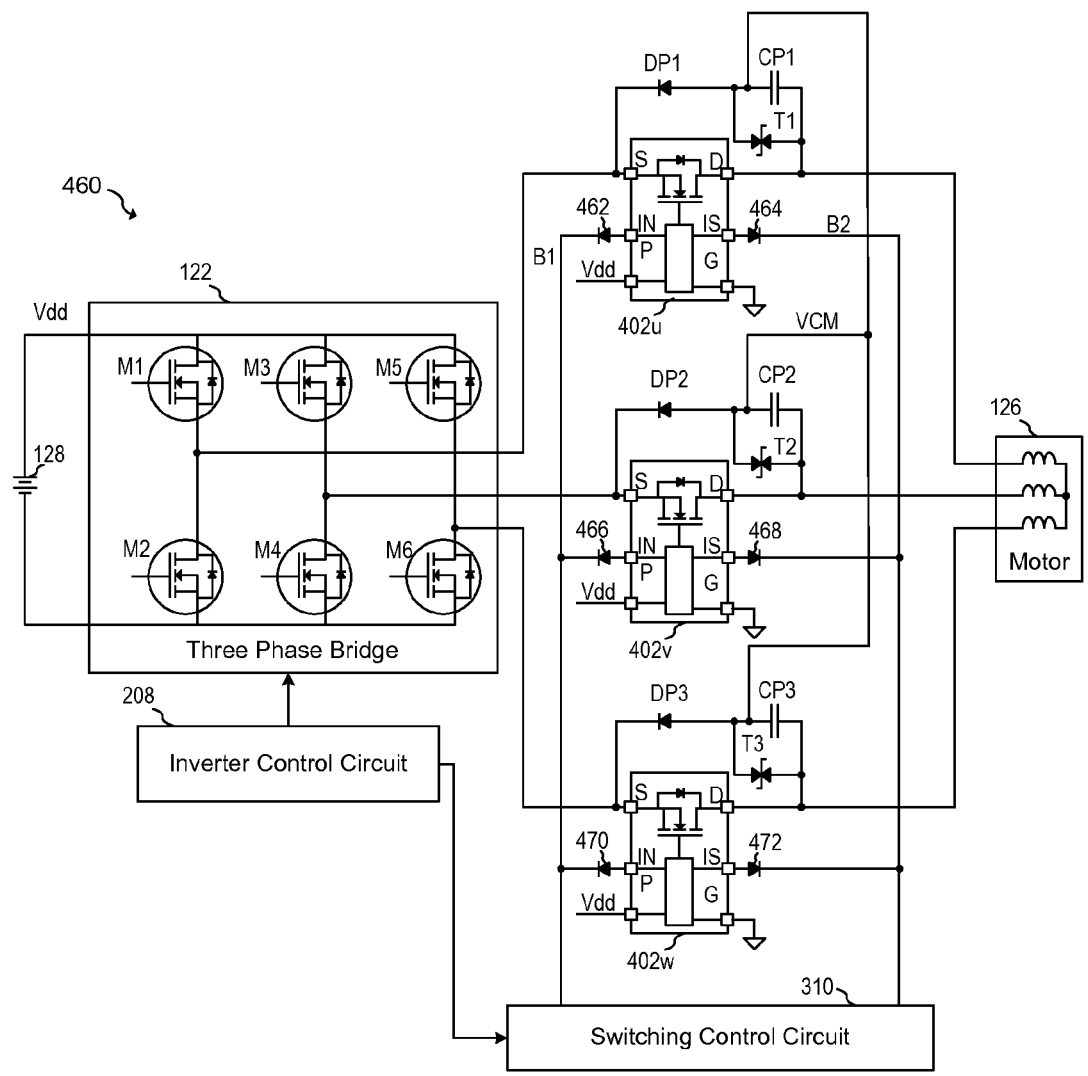
FIG. 4c illustrates a three-phase system that utilizes embodiment phase-separation integrated circuits.

FIG. 4c illustrates three-phase system 460 that couples three-phase bridge circuit 122 to motor 126 via phase separation switch integrated circuits 402u, 402v and 402w that may be implemented as above with respect to integrated circuit 402 shown in FIGS. 4a and 4b. As shown, and embodiment snubber network including diodes DP1, DP2 and DP3 and capacitors CP1, CP2 and CP3 are coupled to phase separation switch integrated circuits 402u, 402v and 402w, as well as TSV circuits T1, T2 and T3. In further embodiments, polarity of the diodes DP1, DP2 and DP3 may be reversed and the TSV circuits T1 T2 and T3 may be omitted or replaced with other components such as varistors as shown in FIGS. 2a, 2b and 2c-2f.

As shown, each IN pin of phase separation switch integrated circuits 402u, 402v and 402w is coupled to switching control circuit 310 via bus line respective diodes B1 and respective diodes 462, 466 and 470, while each Is pin of phase separation switch integrated circuits 402u, 402v and 402w is further coupled to switching control circuit 310 via bus line respective diodes B2 and respective diodes 464, 468 and 472. Fault conditions may be signaled via these diodes by providing a sense current proportional to a load current via pin IS. (See FIGS. 4a and 4b). It should be understood that the embodiments depicted in FIGS. 4a to 4c are just examples of many possible embodiment phase separation switch architecture that allows for a coordinated shutdown of phase separation switches. In alternative embodiments, three-phase system 460 may be implemented using separate components that may include, for example, a current sensing circuit for sending the current flowing through the phase separation switches, a driving circuit for the MOSFET devices and circuitry to enable and disable the phase separation switches.

Figure 5A:
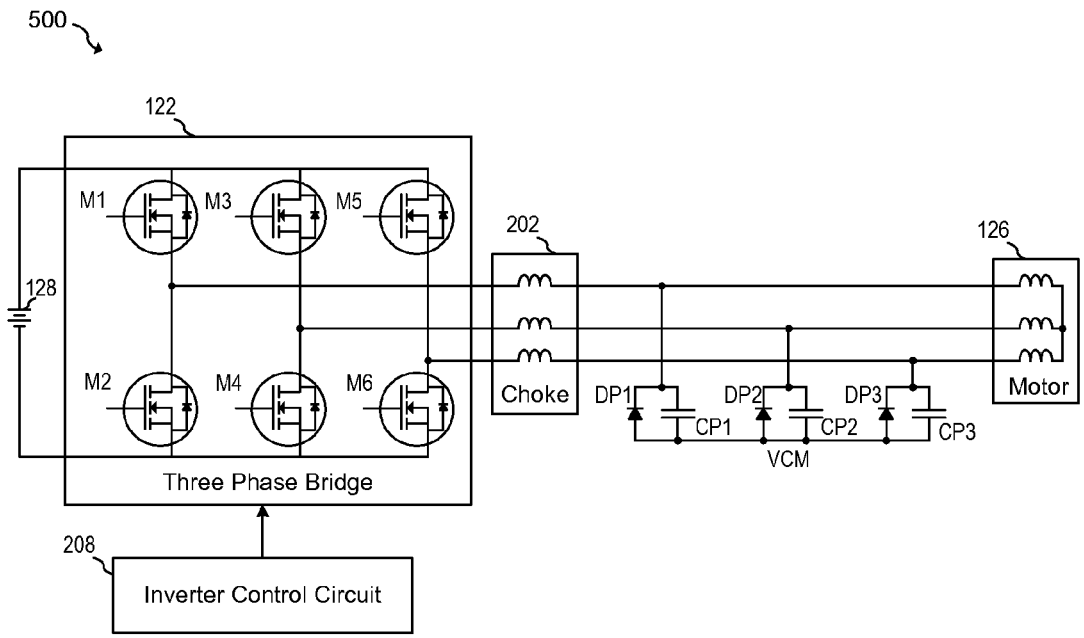
FIGS. 5a-5d illustrate power systems with embodiment snubber circuits.

In some embodiments, phase separation switches may be omitted while an embodiment snubber circuit provides transient suppression to motor 126 and to three-phase bridge 122 as shown in FIG. 5a with respect to three-phase system 500. As shown, the embodiment snubber circuit includes diodes DP1, DP2 and DP3 and capacitors CP1, CP2 and CP3 coupled to floating common node VCM. Operation of the embodiment snubber proceeds as described with respect to the various three-phase embodiments described above.

Figure 5B:
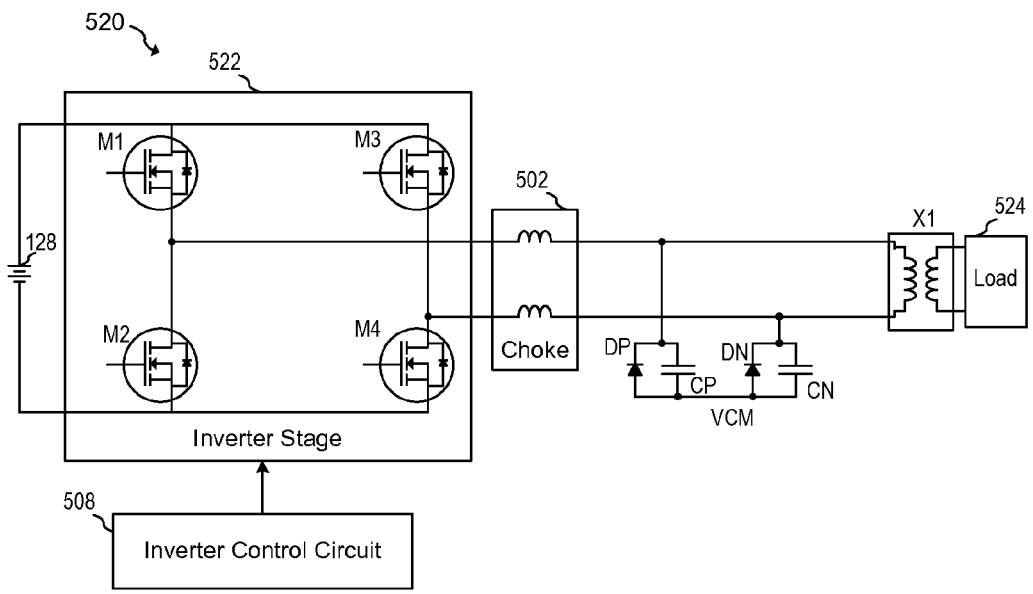

It should be appreciated, however, that embodiment systems are not limited to only three-phase embodiments. In alternative embodiments of the present invention, systems having greater or less than three-phases may be implemented. For example, FIG. 5b illustrates an embodiment system 520 that includes bridge circuit 522 that includes two half-bridge circuits: one that includes transistors M1 and M2 and the other that includes transistors M3 and M4. Bridge circuit 522 is coupled to a two-terminal load 524 via optional choke inductors 502, transformer X1, and an embodiment snubber circuit that includes diodes DP and DN and capacitors CP and CN coupled to floating common node VCM.

Figure 5C:
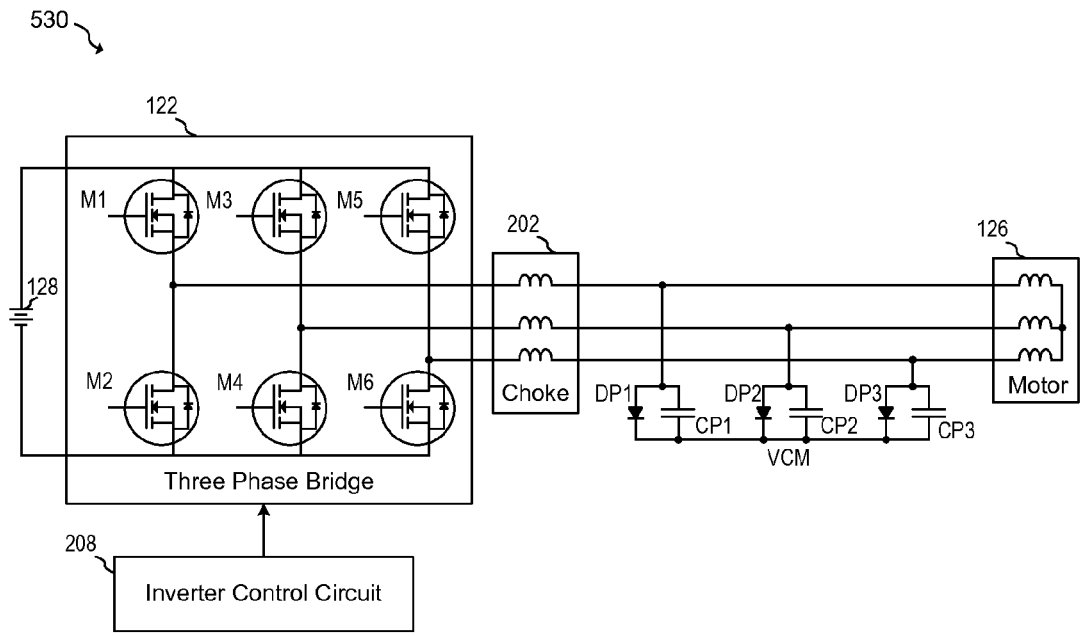
Figure 5D:
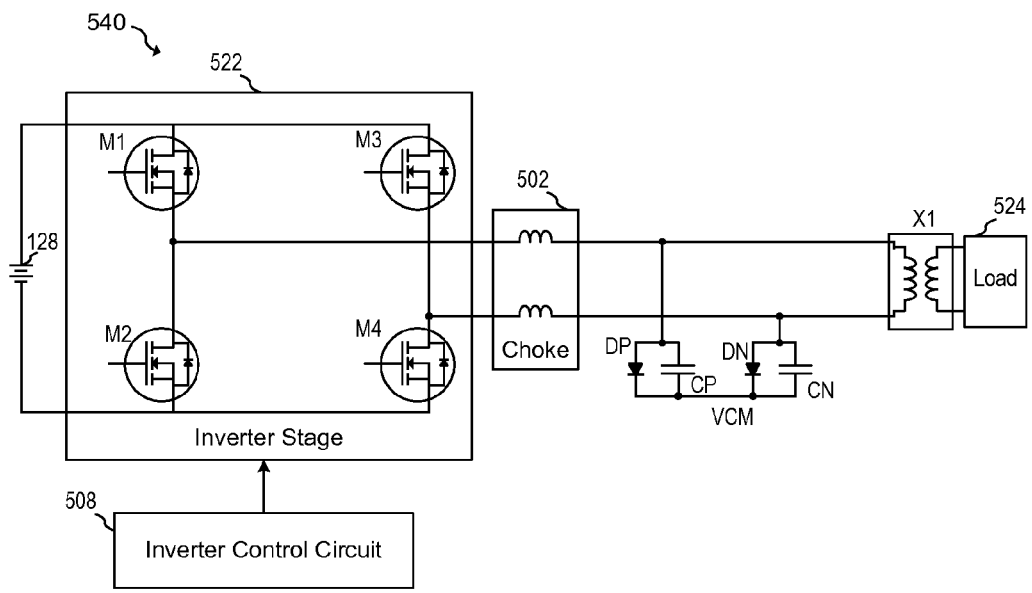

In accordance with other embodiments, snubber diodes may have an opposite polarity. For example, FIG. 5c illustrates embodiment three-phase system 530 that is similar to three-phase system 500 shown in FIG. 5a, with the exception that the polarity of diodes DP1, DP2 and DP3 are reversed with respect to three-phase system 500. For example, the anodes of diodes of DP1, DP2 and DP3 are coupled to motor 524 instead of the cathodes. Similarly, FIG. 5d illustrates embodiment system 540 that is similar to embodiment system 520 shown in FIG. 5b, with the exception that the polarity of diodes DP and DN are reversed with respect to system 520. It should be understood that the various embodiments and described above are just a few examples of many embodiment systems.

Figure 6:
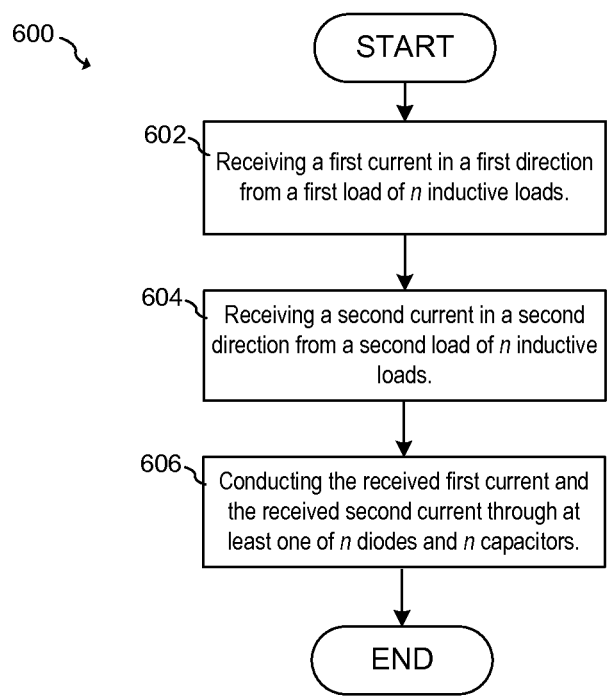
FIG. 6 illustrates a block diagram of an embodiment method.

FIG. 6 illustrates block diagram 600 of an embodiment method of operating a circuit having a snubber circuit coupled to outputs of n half-bridge driver circuits that are coupled to n corresponding inductive loads. The snubber circuit includes n diodes that are each coupled between a corresponding output of the n half-bridge driver circuits and a floating common node, and n capacitors that are each coupled between a corresponding output of the n half-bridge driver circuits and the floating common node, and n is an integer greater than one.

In step 602, a first current having a first direction is received from a first load of the n inductive loads. These inductive loads may represent, for example, the inductance motor windings or the inductance of other multi-phase circuits. In step 604, a second current in a second direction is received from a second load of the n inductive loads. In step 606, the received first current and the received second current are conducted through at least one of the n diodes and the n capacitors.

Figure 7A:
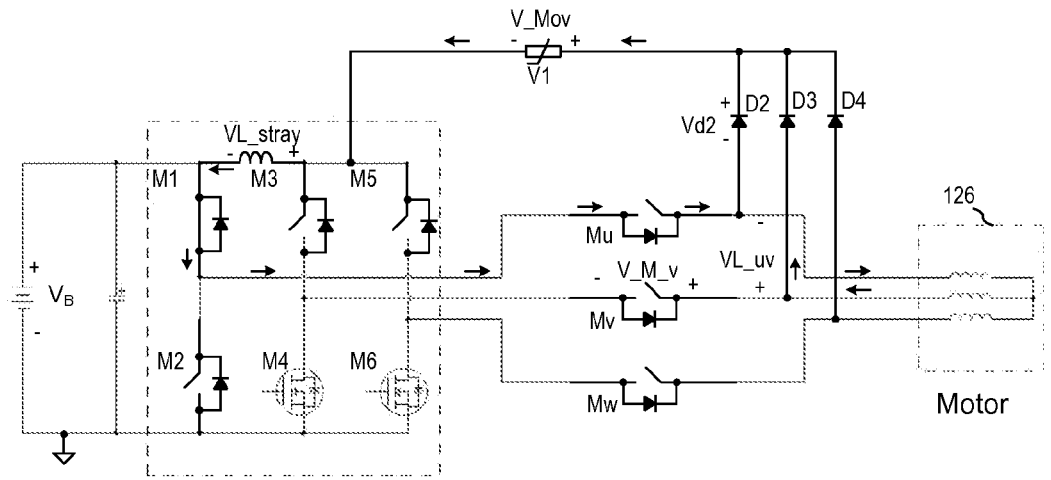
FIG. 7a illustrates a schematic of a conventional three-phase system during a transient current event.
Figure 7B:
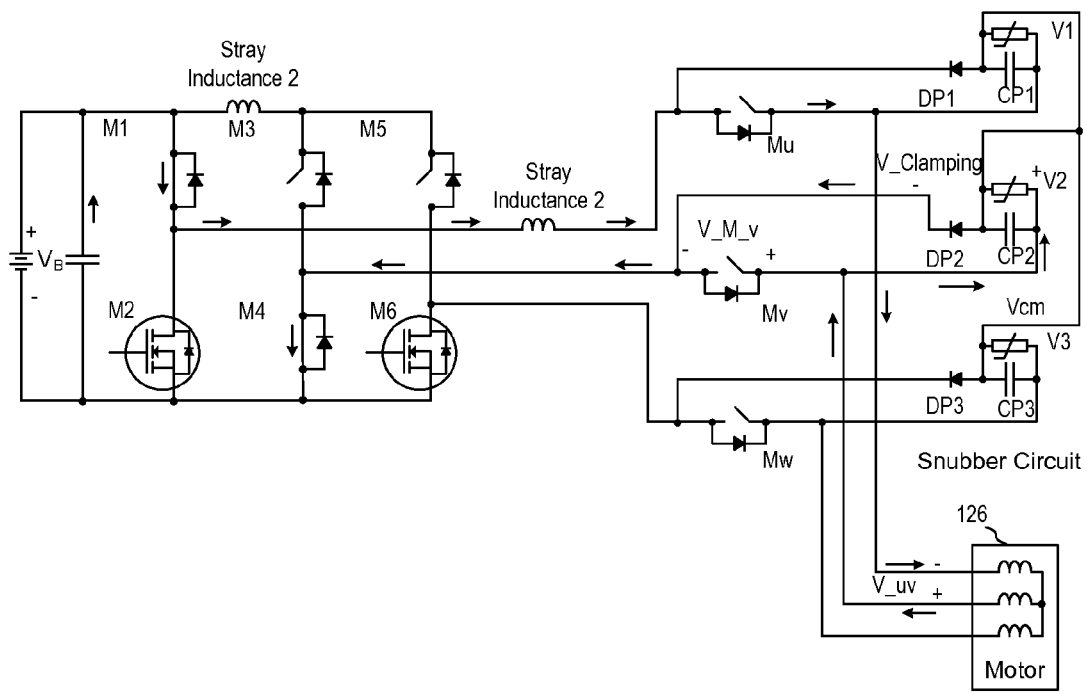
FIG. 7b illustrates a schematic of an embodiment three-phase system during a transient current event.

FIGS. 7a and 7b illustrate a comparison of the transient handling capability of the conventional three-phase system (FIG. 7a) and an embodiment three-phase system (FIG. 7b) at the moment when the phase separation switches are opened. In each of these figures, the path of the current transient is illustrated using small arrows. As shown with respect to the conventional three-phase system of FIG. 7a, the voltage V_M_v across phase separation switch Mv may be expressed as follows:

$$V\_M\_v = VB + VL\_uv = VB + V\_Mov + V\_L\_stray,$$

where VB is the voltage of the input DC power supply, VL_uv is the voltage across two windings of the motor, V_Mov is the voltage across varistor V1 and V_L_stray is the voltage across a stray inductance in the inverter drivers. As is clearly seen in the equation above, the battery voltage VB is a term in the equation, as well as the voltage across the stray inductance, which may be appreciable during fast current transients.

As shown with respect to the embodiment three-phase system of FIG. 7b, the voltage V_M_v across phase separation switch Mv may be expressed as follows:

$$V\_M\_v = V\_Clamping,$$

where V_Clamping is the voltage across varistor V2 and diode DP2 in the embodiment snubber network. As is apparent in the above equation, neither battery voltage VB nor any stray inductance voltages are present. Accordingly, the voltages across the various phase separation switches in the embodiment three-phase system of FIG. 7b are lower during current transients then with respect to the conventional system of FIG. 7a.

In accordance with various embodiments, a circuit includes a snubber circuit configured to be coupled to outputs of n half-bridge driver circuits that are coupled to n corresponding inductive loads, where n is an integer greater than one. The snubber circuit includes n diodes, each of the n diodes coupled between a corresponding output of the n half-bridge driver circuits and a floating common node; and n capacitors, each of the n capacitors coupled between a corresponding output of the n half-bridge driver circuits and the floating common node. Other embodiments of this aspect include corresponding circuits and systems configured to perform the various actions of the circuit.

Implementations may include one or more of the following features. The circuit where: n=3; and the n corresponding inductive loads include terminals of a three-phase motor. The circuit further including the n half-bridge driver circuits and/or the three-phase motor. The circuit where a cathode of each of the n diodes is coupled to the corresponding output of the n half-bridge driver circuits and an anode of each of the n diodes is coupled to the floating common node. In some embodiments, the an anode of each of the n diodes is coupled to the corresponding output of the n half-bridge driver circuits and a cathode of each of the n diodes is coupled to the floating common node. The circuit further including a choke inductor coupled between an output of the n half-bridge driver circuits and a corresponding inductive load of the n corresponding inductive loads.

In an embodiment, the circuit further includes n transistors having a first load path terminal coupled to the corresponding output of the n half-bridge driver circuits and a second load path terminal coupled to a corresponding load of the n inductive loads, where each of the n diodes is coupled between the first load path terminal of a corresponding transistor of the n transistors and the floating common node, and each of the n capacitors is coupled between the second load path terminal of the corresponding transistor of the n transistors and the floating common node. In an embodiment, an anode of a body diode of each of the n transistors is coupled its first load path terminal and a cathode of each of the n diodes is coupled to the first load path terminal of the corresponding transistor of the n transistors. The cathode of a body diode of each of the n transistors may be coupled to its first load path terminal and an anode of each of the n diodes may be coupled to the first load path terminal of the corresponding transistor of the n transistors.

The circuit may further include n transient voltage suppression (TVS) diodes coupled in parallel with corresponding capacitors of the n capacitors and/or n varistors coupled in parallel with corresponding capacitors of the n capacitors. In some embodiments, the circuit may further include n overload protection circuits having an output coupled to a corresponding control input of a corresponding transistor of the n transistors, where each overload protection circuit is configured to detect an overload condition in its corresponding transistor and shut down its corresponding transistor via the control input of the corresponding transistor when the overload condition is detected. The circuit may also include a bus coupled to each of the n overload protection circuits, where the each of the n overload protection circuits are configured to assert a signal on the bus when an overload condition is detected, and each of the n overload protection circuits are configured to shut down its corresponding transistor when an asserted signal generated from another overload protection circuit is detected on the bus. In an embodiment, the overload condition includes an overcurrent condition.

Another general aspect includes a three-phase motor driving circuit including: a first half-bridge driving circuit having an output coupled to a first load terminal; a first phase separation transistor having a first load path terminal coupled to the output of the first half-bridge driving circuit and a second load path terminal coupled to the first load terminal; a first snubber circuit including a first diode coupled between the first load path terminal of the first phase separation transistor and a floating common node, and a second capacitor coupled between the second load path terminal of the first phase separation transistor and the floating common node. The circuit further includes a second half-bridge driving circuit having an output coupled to a second load terminal; a second phase separation transistor having a first load path terminal coupled to the output of the second half-bridge driving circuit and a second load path terminal coupled to the second load terminal; a second snubber circuit including a second diode coupled between the first load path terminal of the second phase separation transistor and the floating common node, and a second capacitor coupled between the second load path terminal of the second phase separation transistor and the floating common node. Also included is a third half-bridge driving circuit having an output coupled to a third load terminal; a third phase separation transistor having a first load path terminal coupled to the output of the third half-bridge driving circuit and a second load path terminal coupled to the third load terminal; and a third snubber circuit including a third diode coupled between the first load path terminal of the third phase separation transistor and the floating common node, and a third capacitor coupled between the second load path terminal of the third phase separation transistor and the floating common node. The first load terminal, second load terminal and third load terminal are configured to be coupled to a three-phase motor. Other embodiments of this aspect include corresponding circuits and systems configured to perform the various actions of the circuit.

Implementations may include one or more of the following features. The circuit further includes: a first choke inductor coupled between the output of the first half-bridge driving circuit and the first load path terminal of the first phase separation transistor; a second choke inductor coupled between the output of the second half-bridge driving circuit and the first load path terminal of the second phase separation transistor; and a third choke inductor coupled between the output of the third half-bridge driving circuit and the first load path terminal of the third phase separation transistor. In an embodiment, a cathode of a body diode of the first phase separation transistor is coupled to the first load path terminal of the first phase separation transistor, and an anode of the first diode is coupled to the first load path terminal of the first phase separation transistor; a cathode of a body diode of the second phase separation transistor is coupled to the first load path terminal of the second phase separation transistor, and an anode of the second diode is coupled to the first load path terminal of the second phase separation transistor; and a cathode of a body diode of the third phase separation transistor is coupled to the first load path terminal of the third phase separation transistor, and an anode of the third diode is coupled to the first load path terminal of the third phase separation transistor.

In an embodiment, an anode of a body diode of the first phase separation transistor is coupled to the first load path terminal of the first phase separation transistor, and a cathode of the first diode is coupled to the first load path terminal of the first phase separation transistor; an anode of a body diode of the second phase separation transistor is coupled to the first load path terminal of the second phase separation transistor, and a cathode of the second diode is coupled to the first load path terminal of the second phase separation transistor; and an anode of a body diode of the third phase separation transistor is coupled to the first load path terminal of the third phase separation transistor, and a cathode of the third diode is coupled to the first load path terminal of the third phase separation transistor.

The circuit may further include: a first overload protection circuit coupled to a control node of the first phase separation transistor, the first overload protection circuit configured to turn off the first phase separation transistor upon detection of an overload condition in the first phase separation transistor; a second overload protection circuit coupled to a control node of the second phase separation transistor, the second overload protection circuit configured to turn off the second phase separation transistor upon detection of an overload condition in the second phase separation transistor; and a third overload protection circuit coupled to a control node of the third phase separation transistor, the third overload protection circuit configured to turn off the third phase separation transistor upon detection of an overload condition in the third phase separation transistor.

Another general aspect includes a method of operating a circuit that includes a snubber circuit coupled to outputs of n half-bridge driver circuits that are coupled to n corresponding inductive loads, where n is an integer greater than one, where the snubber circuit includes n diodes that are each coupled between a corresponding output of the n half-bridge driver circuits and a floating common node, and n capacitors that are each coupled between a corresponding output of the n half-bridge driver circuits and the floating common node. The method includes receiving a first current in a first direction from a first load of the n inductive loads; receiving a second current in a second direction from a second load of the n inductive loads; and conducting the received first current and the received second current through at least one of the n diodes and n capacitors. Other embodiments of this aspect include corresponding circuits and systems configured to perform the various actions of the method.

Implementations may include one or more of the following features. The method where: the circuit further includes n transistors having a first load path terminal coupled to the corresponding output of the n half-bridge driver circuits and a second load path terminal coupled to a corresponding load of the n inductive loads; each of the n diodes is coupled between the first load path terminal of a corresponding transistor of the n transistors and the floating common node, and each of the n capacitors is coupled between the second load path terminal of the corresponding transistor of the n transistors and the floating common node; and the method further includes transitioning each of the n transistors from a conducting state to a non-conducting state upon detection of an overload condition.

The method may further include detecting the overload condition. In an embodiment, detecting the overload condition includes detecting an overcurrent or an overvoltage condition in at least one of the n transistors. In an embodiment, the inductive loads include terminals of a three-phase motor; and the method further includes operating the three-phase motor via the n half-bridge driver circuits.

Advantages of some embodiments include the ability to control the overshoot voltage and the rise time of voltages across a phase separation switch by adjusting the capacitance of a snubber capacitor. Another advantageous aspect of some embodiments is the ability to place each snubber circuit components, for example, a diode, capacitor varistor and/or TVS very close to its corresponding electric switch. Accordingly, the snubber circuit may be immune from influence of stray inductance in the power loop including the battery, DC link capacitor, and three-phase bridge circuitry.

A further advantage includes the ability for the phase separation switches and the snubber circuit to work in a switching mode at a certain frequency range, for example, 1 KHz, to implement a current limiting function. In some embodiments, it is easier to distinguish between a malfunctioning circuit and a normally operating circuit using a current limiting compared to a switching-off one time mode. Accordingly, the circuit is less prone to shutdown in the presence of noise or a random current transient.

A further advantage includes the ability to not only control the overshoot voltage of the phase separation switches, but to also reduce overshoot voltage of three-phase bridge when it switches off. Because the snubber circuits suppress the sharp rising EMF voltage and form a new distributary for the motor inductor freewheeling current, the current of other path by which motor inductor freewheeling current flows through three-phase bridge may also be reduced.

A further advantage includes reduced power loss when the various switching in the three-phase circuit are switched off. For example, in some embodiments, as the capacitance of the snubber circuit increases, there is less voltage overshoot and less power lost when the switches are switched-off.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of intraoperative hardware units, including one or more processors as described above, in conjunction with suitable software and/or firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
a snubber circuit configured to be coupled to outputs of n half-bridge driver circuits that are coupled to n corresponding inductive loads, wherein n is an integer greater than one, the snubber circuit comprising
n diodes, each of the n diodes coupled between a corresponding output of the n half-bridge driver circuits and a floating common node, and
n capacitors, each of the n capacitors coupled between the corresponding output of the n half-bridge driver circuits and the floating common node; and
n transistors having a first load path terminal coupled to the corresponding output of the n half-bridge driver circuits and a second load path terminal coupled to a corresponding load of the n inductive loads, wherein each of the n diodes is coupled between the first load path terminal of a corresponding transistor of the n transistors and the floating common node, and each of the n capacitors is coupled between the second load path terminal of the corresponding transistor of the n transistors and the floating common node.

2. The circuit of claim 1, wherein:
n=3; and
the n corresponding inductive loads comprise terminals of a three-phase motor.

3. The circuit of claim 2, further comprising the n half-bridge driver circuits.

4. The circuit of claim 3, further comprising the three-phase motor.

5. The circuit of claim 1, wherein a cathode of each of the n diodes is coupled to the corresponding output of the n half-bridge driver circuits and an anode of each of the n diodes is coupled to the floating common node.

6. The circuit of claim 1, wherein an anode of each of the n diodes is coupled to the corresponding output of the n half-bridge driver circuits and a cathode of each of the n diodes is coupled to the floating common node.

7. The circuit of claim 1, further comprising a choke inductor coupled between an output of the n half-bridge driver circuits and a corresponding inductive load of the n corresponding inductive loads.

8. The circuit of claim 1, wherein an anode of a body diode of each of the n transistors is coupled to its first load path terminal and a cathode of each of the n diodes is coupled to the first load path terminal of the corresponding transistor of the n transistors.

9. The circuit of claim 1, wherein a cathode of a body diode of each of the n transistors is coupled to its first load path terminal and an anode of each of the n diodes is coupled to the first load path terminal of the corresponding transistor of the n transistors.

10. The circuit of claim 1, further comprising n transient voltage suppression (TVS) diodes coupled in parallel with corresponding capacitors of the n capacitors.

11. The circuit of claim 1, further comprising n varistors coupled in parallel with corresponding capacitors of the n capacitors.

12. The circuit of claim 1, further comprising n overload protection circuits having an output coupled to a corresponding control input of a corresponding transistor of the n transistors, wherein each overload protection circuit is configured to detect an overload condition in its corresponding transistor and shut down its corresponding transistor via the control input of the corresponding transistor when the overload condition is detected.

13. The circuit of claim 12, further comprising a bus coupled to each of the n overload protection circuits, wherein the each of the n overload protection circuits are configured to assert a signal on the bus when an overload condition is detected, and each of the n overload protection circuits are configured to shut down its corresponding transistor when an asserted signal generated from another overload protection circuit is detected on the bus.

14. The circuit of claim 12, wherein the overload condition comprises an overcurrent condition.

15. A three-phase motor driving circuit comprising:
a first half-bridge driving circuit having an output coupled to a first load terminal;
a first phase separation transistor having a first load path terminal coupled to the output of the first half-bridge driving circuit and a second load path terminal coupled to the first load terminal;
a first snubber circuit comprising a first diode coupled between the first load path terminal of the first phase separation transistor and a floating common node, and a second capacitor coupled between the second load path terminal of the first phase separation transistor and the floating common node;
a second half-bridge driving circuit having an output coupled to a second load terminal;
a second phase separation transistor having a first load path terminal coupled to the output of the second half-bridge driving circuit and a second load path terminal coupled to the second load terminal;
a second snubber circuit comprising a second diode coupled between the first load path terminal of the second phase separation transistor and the floating common node, and a second capacitor coupled between the second load path terminal of the second phase separation transistor and the floating common node;
a third half-bridge driving circuit having an output coupled to a third load terminal;
a third phase separation transistor having a first load path terminal coupled to the output of the third half-bridge driving circuit and a second load path terminal coupled to the third load terminal; and
a third snubber circuit comprising a third diode coupled between the first load path terminal of the third phase separation transistor and the floating common node, and a third capacitor coupled between the second load path terminal of the third phase separation transistor and the floating common node, wherein the first load terminal, second load terminal and third load terminal are configured to be coupled to a three-phase motor.

16. The circuit of claim 15, further comprising:
a first choke inductor coupled between the output of the first half-bridge driving circuit and the first load path terminal of the first phase separation transistor;
a second choke inductor coupled between the output of the second half-bridge driving circuit and the first load path terminal of the second phase separation transistor; and
a third choke inductor coupled between the output of the third half-bridge driving circuit and the first load path terminal of the third phase separation transistor.

17. The circuit of claim 15, wherein:
a cathode of a body diode of the first phase separation transistor is coupled to the first load path terminal of the first phase separation transistor, and an anode of the first diode is coupled to the first load path terminal of the first phase separation transistor;

a cathode of a body diode of the second phase separation transistor is coupled to the first load path terminal of the second phase separation transistor, and an anode of the second diode is coupled to the first load path terminal of the second phase separation transistor; and a cathode of a body diode of the third phase separation transistor is coupled to the first load path terminal of the third phase separation transistor, and an anode of the third diode is coupled to the first load path terminal of the third phase separation transistor.

18. The circuit of claim 15, wherein:

an anode of a body diode of the first phase separation transistor is coupled to the first load path terminal of the first phase separation transistor, and a cathode of the first diode is coupled to the first load path terminal of the first phase separation transistor;

an anode of a body diode of the second phase separation transistor is coupled to the first load path terminal of the second phase separation transistor, and a cathode of the second diode is coupled to the first load path terminal of the second phase separation transistor; and an anode of a body diode of the third phase separation transistor is coupled to the first load path terminal of the third phase separation transistor, and a cathode of the third diode is coupled to the first load path terminal of the third phase separation transistor.

19. The circuit of claim 15, further comprising:

a first overload protection circuit coupled to a control node of the first phase separation transistor, the first overload protection circuit configured to turn off the first phase separation transistor upon detection of an overload condition in the first phase separation transistor;

a second overload protection circuit coupled to a control node of the second phase separation transistor, the second overload protection circuit configured to turn off the second phase separation transistor upon detection of an overload condition in the second phase separation transistor; and a third overload protection circuit coupled to a control node of the third phase separation transistor, the third overload protection circuit configured to turn off the third phase separation transistor upon detection of an overload condition in the third phase separation transistor.

20. A method of operating a circuit that includes a snubber circuit coupled to outputs of n half-bridge driver circuits that are coupled to n corresponding inductive loads, wherein n is an integer greater than one, wherein the snubber circuit includes n diodes that are each coupled between a corresponding output of the n half-bridge driver circuits and a floating common node, and n capacitors that are each coupled between the corresponding output of the n half-bridge driver circuits and the floating common node, the method comprising:

providing a first current by an output of a first half-bridge driver circuit of the n half-bridge driver circuits from a first load of the n inductive loads, wherein the first current flows from the output of the first half-bridge driver circuit of the n half-bridge driver circuits to the first load of the n inductive loads;

providing a second current by an output of a second half-bridge driver circuit of the n half-bridge driver circuits from a second load of the n inductive loads, wherein the second current flows from the second load of the n inductive loads to the output of the second half-bridge driver circuit of the n half-bridge driver circuits;

conducting the first current and the second current through at least one of the n diodes and n capacitors, wherein the circuit further comprises n transistors having a first load path terminal coupled to the corresponding output of the n half-bridge driver circuits and a second load path terminal coupled to a corresponding load of the n inductive loads, and each of the n diodes is coupled between the first load path terminal of a corresponding transistor of the n transistors and the floating common node, and each of the n capacitors is coupled between the second load path terminal of the corresponding transistor of the n transistors and the floating common node; and transitioning each of the n transistors from a conducting state to a non-conducting state upon detection of an overload condition.

21. The method of claim 20, further comprising detecting the overload condition.

22. The method of claim 21, wherein detecting the overload condition comprises detecting an overcurrent condition in at least one of the n transistors.

23. The method of claim 21, wherein detecting the overload condition comprises detecting an overvoltage condition in at least one of the n transistors.

24. The method of claim 20, wherein:

the inductive loads comprise terminals of a three-phase motor; and the method further comprises operating the three-phase motor via the n half-bridge driver circuits.

* * * * *